United States Patent
Bernard et al.

(10) Patent No.: US 8,179,096 B2
(45) Date of Patent: May 15, 2012

(54) BATTERY PROTECTION METHOD AND CIRCUIT THEREFOR

(75) Inventors: Patrick Bernard, Saint Martin le Vinous (FR); Pierre Daude, Grenoble (FR); Pascal Debaty, Domene (FR); Christian Perrin, Saint Georges de Commiers (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 973 days.

(21) Appl. No.: 11/570,400

(22) PCT Filed: Aug. 23, 2004

(86) PCT No.: PCT/US2004/027346
§ 371 (c)(1),
(2), (4) Date: Jul. 15, 2008

(87) PCT Pub. No.: WO2006/022738
PCT Pub. Date: Mar. 2, 2006

(65) Prior Publication Data
US 2008/0303487 A1    Dec. 11, 2008

(51) Int. Cl.
*H01M 10/44*    (2006.01)

(52) U.S. Cl. .................................. 320/134; 320/136
(58) Field of Classification Search .................. 320/132, 320/134, 136, 137, 141, FOR. 108, FOR. 126, 320/FOR. 138
See application file for complete search history.

(56) References Cited

U.S. PATENT DOCUMENTS

| | | | |
|---|---|---|---|
| 5,534,795 A * | 7/1996 | Wert et al. | 326/81 |
| 5,909,103 A * | 6/1999 | Williams | 320/134 |
| 5,949,218 A * | 9/1999 | Colles et al. | 320/134 |
| 7,262,581 B2 * | 8/2007 | Rutter et al. | 320/134 |
| 2002/0011821 A1* | 1/2002 | Fujisawa | 320/134 |
| 2009/0091295 A1* | 4/2009 | Wan | 320/134 |

* cited by examiner

*Primary Examiner* — Jay Patidar
(74) *Attorney, Agent, or Firm* — Robert F. Hightower

(57) ABSTRACT

In one embodiment, a circuit is formed to couple a battery to a charging voltage at least a portion of a time when the charging voltage is greater than zero volts and is less than a first voltage value. The circuit is also formed to decouple the battery from the charging voltage approximately when the charging voltage is greater than the first voltage and also approximately when the charging voltage is no greater than zero volts.

16 Claims, 3 Drawing Sheets

BATTERY PROTECTION METHOD AND CIRCUIT THEREFOR

BACKGROUND OF THE INVENTION

The present invention relates, in general, to electronics, and more particularly, to methods of forming semiconductor devices and structure.

In the past, the electronics industry utilized various methods and circuits to protect batteries, such as lithium ion (Li-Ion) batteries, from unpredictable voltages that would be applied to the battery by a battery charging controller. Typically the output of the battery charging controller was regulated, however, if the controller were incorrectly connected excessive-voltages were applied to the battery. One example of such a battery charging controller was the Max4840 manufactured by Maxim Integrated Products of Sunnyvale Calif. The Max4840 used an N-channel MOS transistor which was disabled if the battery charging voltage exceeded about six volts. One problem with the prior controllers was that the battery was not protected against reverse or negative voltages. The negative voltages detrimentally affected the battery and could also damage the charging controller.

Accordingly, it is desirable to have a battery protection circuit that protects the battery from both positive over voltages and negative under voltages.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
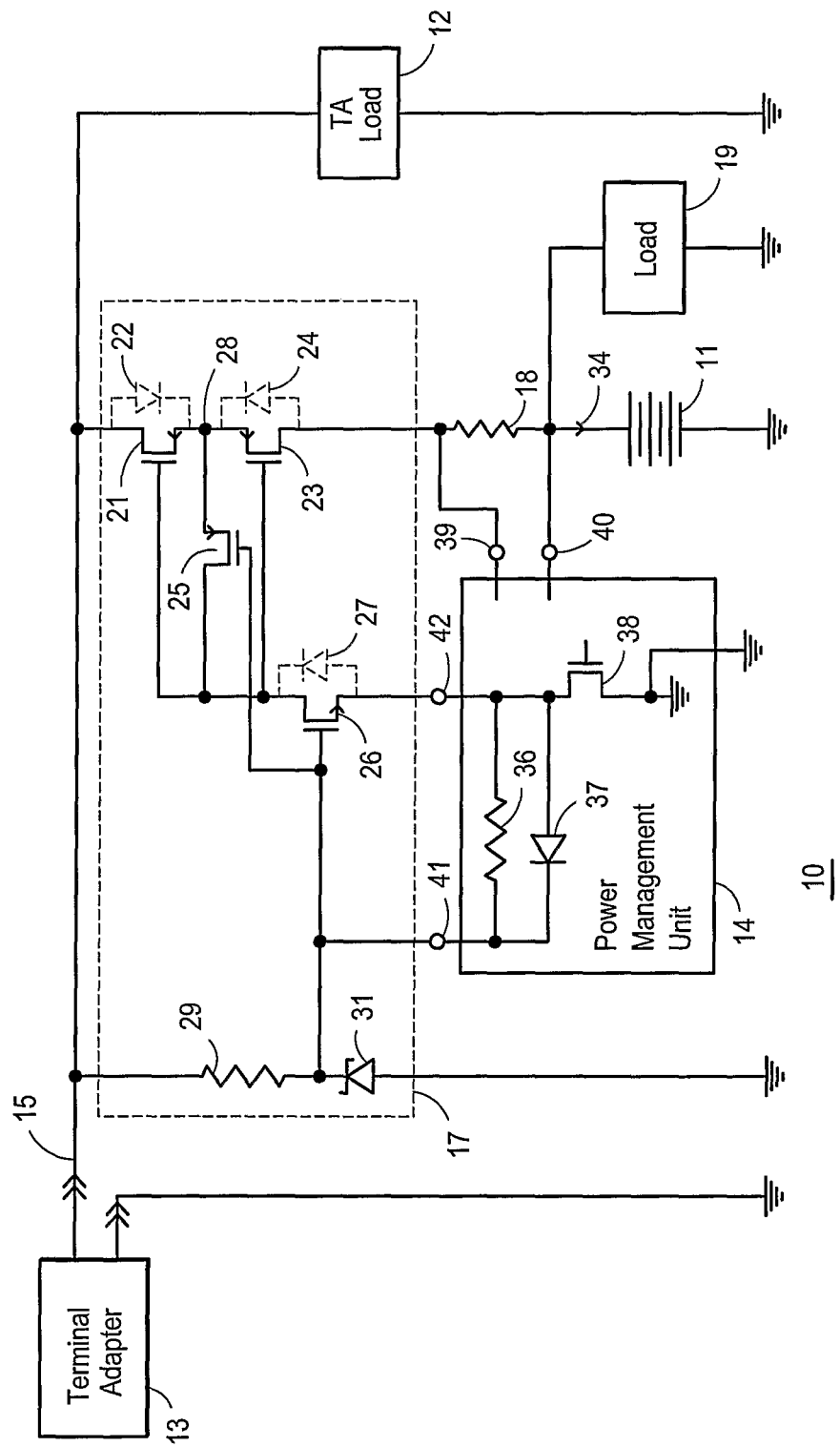
FIG. 1 schematically illustrates an embodiment of a portion of a battery protection system in accordance with the present invention.

FIG. 1 schematically illustrates a portion of an embodiment of a battery protection system 10 that protects a battery 11 from over-voltage and under-voltage conditions. Battery 11 is utilized to supply an operating voltage and operating current to a load 19 such as a cellular telephone, an electronic organizer, or a laptop computer. Battery 11 is charged by a charging voltage and charging current that is supplied by a terminal adapter (TA) 13. Terminal adapter 13 typically receives power from an external circuit (not shown) such as a household mains, and converts the power to a charging voltage that is suitable for operating load 19 and for charging battery 11. The charging voltage often is a low value dc voltage, for example a haversine dc voltage of about four to fifteen volts. Adapter 13 typically applies the charging voltage to a voltage input 15 of system 10. In some embodiments a TA load 12, for example a resistor, may be connected to input 15 to facilitate operation of adapter 13. As will be further hereinafter, a protection circuit 17 is configured to couple the charging voltage from input 15 to battery 11 for most of the time when the value of the charging voltage is greater than approximately zero volts (0 V) but is less than a first voltage value. Those skilled in the art realize that such coupling and decoupling can not occur instantaneously but that it begins to occur approximately upon the described condition. Typically, a battery charging circuit or power management unit 14 is used to monitor the value of a battery charging current 34 that is utilized to charge battery 11. Power management unit 14 receives a sense signal, on sense inputs 39 and 40, that represents the value of current 34 and uses the value of the sense signal to control the value of charging current 34 that is applied to battery 11. Unit 14 also uses the sense signal to supply a control signal on a control output 42 of unit 14 that assists in operating circuit 17. In the preferred embodiment, current 34 flows through a resistor 18 to form the sense signal that is representative of current 34. Unit 14 also receives an operating voltage, often referred to as Vdd, at a voltage input 41 of unit 14. Unit 14 typically has an internal voltage sensor circuit that senses that the value of the Vdd voltage is within the normal operating range and less than the first voltage value that is approximately the maximum upper limit of the normal operating voltage used for operating unit 14. The voltage value of the internal voltage sensor may be adjustable and established by components attached externally to unit 14 or may be set internally to unit 14. Typically the maximum value of the first voltage is less than the maximum value to which battery 11 may be charged. For example, battery 11 may be designed to supply a nominal voltage of approximately four volts (4 V) and to be charged to a voltage that is no greater than about six volts (6 V). For this example, the first voltage value is approximately six volts (6 V) and circuit 17 couples battery 11 to the charging voltage approximately when the value of the charging voltage is greater than approximately zero volts (0 V) but is less than the first voltage value of approximately six volts (6 V). Power management units that function in a manner similar to power management unit 14 are well known to those skilled in the art. One example of such a power management unit is manufactured by Maxim Integrated Producers of Sunnyvale Calif. under part number MAX1736.

Circuit 17 includes a plurality of P-channel MOS transistors, including a first transistor 21, a second transistor 23, and a third transistor 25, that have the sources commonly connected together at a common node 28. An N-channel transistor 26 of circuit 17 is connected to the plurality of P-channel transistors to assist in providing the protection functionality of circuit 17. Circuit 17 also includes a clamp circuit 31, such as a zener diode, that function to clamp the value of the Vdd voltage applied to input 41 to a second voltage value or clamp voltage. The value of the second voltage is usually chosen to be no greater than the maximum voltage sustainable by unit 14. For example, the maximum value of Vdd that can be applied to unit 14 may be limited to twelve volts (12 V) due to the process used to manufacture unit 14, thus, the second voltage is chosen to be no greater than about twelve volts. Additionally, circuit 17 includes a thermistor 29 that assists in limiting the power dissipation of system 10.

For approximately the time that the value of the charging voltage on input 15 is greater than approximately zero volts (0 V) but less than the first voltage value, the value of the charging voltage is applied to input 41 of unit 14. Those skilled in the art realize that some time is taken to sense voltage values and to responsively enable and disable transistors, thus, battery 11 may not be coupled for the entire time. While the value of Vdd is greater than approximately zero volts and less than approximately the first value, unit 14 regulates the value of current 34 to a value desired for charging battery 11. The desired value is set by the value of resistor 18 and circuits internal to unit 14, such as reference voltages and comparators. Unit 14 controls transistor 38 to apply a control voltage to control output 42, thus to the source of transistor 26, that regulates the value of current 34. Since the gate of transistor 26 is at Vdd and the source is at a voltage that is less than the gate, transistor 26 is enabled which applies approximately the control voltage from output 42 to the gates of transistors 21 and 23 which causes transistors 21 and 23 to conduct. Transistors 21 and 23 couple battery 11 to the charging voltage at input 15 and the value of the gate voltage of transistors 21 and 23 is controlled by unit 14 to regulate the value of current 34. Since the voltage of battery 11 is no greater than, and typically is less than, the charging voltage the gate of transistor 25 is at a voltage that is equal to or greater than the source of transistor 25, thus, transistor 25 is disabled and has no effect on battery 11.

If the value of the charging voltage at input 15 increases, circuit 17 continues to couple battery 11 to the charging voltage until the value of the charging voltage exceeds a value that is approximately equal to the first value. Approximately when the value of the charging voltage is greater than the first value but is less than a second voltage value established by the clamp voltage, circuit 17 begins to decouple battery 11 from the charging voltage. Unit 14 senses that the Vdd voltage value is greater than the first voltage value and disables the operation of unit 14 and transistor 38. Unit 14 typically has a voltage gain resistor 36 that is connected between input 41 and output 42. During normal operation of unit 14, resistor 36 typically is used to set the voltage gain of the control loop that regulates the value of current 34. In some power management units, resistor 36 may be a P-channel MOS transistor with a gate that is controlled by the power management unit. In other embodiments, resistor 36 may be external to the power management unit. Since unit 14 is disabled, resistor 36 pulls the source of transistor 26 to a voltage that is substantially equal to Vdd or the charging voltage. Since the gate and source of transistor 26 are approximately equal, transistor 26 becomes disabled. The voltage on the source of transistor 26 forward biases a body diode 27 of transistor 26 and applies the Vdd voltage to the drain of transistor 25 and to the gates of transistors 21 and 23. The drain of transistor 21 is also at a voltage approximately equal to the charging voltage which forward biases a body diode 22 of transistor 21 and applies the charging voltage to node 28 and to the sources of transistors 21, 23, and 25. Since the gate of transistors 21, 23, and 25 are all at a voltage approximately equal to the charging voltage and the sources are also at an approximately equal voltage, transistors 21, 23, and 25 are disabled or turned-off. Thus, at least approximately when the charging voltage becomes greater than the first voltage value, circuit 17 begins to decouple battery 11 from the charging voltage in order to protect battery 11. Circuit 17 continues to decouple battery 11 from the charging voltage approximately as long as the charging voltage is within this voltage range. Consequently, circuit 17 decouples battery 11 from the charging voltage for at least a portion of the time that the charging voltage is greater than the first voltage value.

If the charging voltage increases to a voltage that is greater than the value of the clamp voltage of clamp circuit 31, circuit 17 continues to decouple battery 11 from the charging voltage. If the charging voltage is greater than the clamp voltage, the zener diode of circuit 31 clamps the Vdd voltage and the voltage applied to the gates of transistors 25 and 26 to the clamp voltage. Since unit 14 is disabled and transistor 38 is off, resistor 36 also applies the clamp voltage to the source of transistor 26, thus, transistor 26 remains disabled and diode 27 applies the clamp voltage to the drain of transistor 25 and to the gates of transistors 21 and 23. Body diode 22 of transistor 21 applies the charging voltage to node 28, thus, to the sources of transistors 21, 23, and 25. Since the charging voltage is greater than the clamp voltage, transistor 25 is enabled and switches off transistor 23 which ensures that battery 11 remains decoupled from the charging voltage. Also since the charging voltage is greater than the clamp voltage, transistor 21 is enabled. If the charging voltage does not exceed the clamp voltage by at least the value of the voltage drop of body diode 22 plus the value of the threshold voltage of transistor 25, transistor 25 remains disabled and prevents current flow from diode 22 to clamp circuit 31 thereby decreasing power dissipation. If the charging voltage does exceed the clamp voltage by at least the value of the voltage drop of body diode 22 plus the value of the threshold voltage of transistor 25, transistor 25 becomes enabled and applies the charging voltage to the gates of transistors 21 and 23. Since the sources and gates of transistors 21 and 23 are at approximately equal voltages, transistors 21 and 23 are disabled and battery 11 remains decoupled from the charging voltage. Transistor 25 also applies the charging voltage to diode 27 which disables diode 27 thereby limiting power dissipation.

If the value of the charging voltage is approximately zero volts (0 V) or less, circuit 17 also decouples battery 11 from the charging voltage in order to protect battery 11 and unit 14 from reverse voltages. Such reverse voltage may destroy unit 14 or battery 11. Circuit 17 also protects battery 11 from reverse current flow to unit 14 or load 12. For example, terminal adapter 13 may be disconnected from input 15, thus, the charging voltage would be approximately zero volts, or terminal adapter 13 may be incorrectly connected to input 15 and apply a negative charging voltage to input 15, thus, to input 41 of unit 14. The value of Vdd is approximately zero volts or less, thus, unit 14 and transistor 38 are disabled. However, resistor 36 applies the value of Vdd to the source of transistor 26. Consequently, the gate and source of transistor 26 are at substantially the same voltage and transistor 26 is disabled. Resistor 18 couples the battery voltage from battery 11 to the drain of transistor 23. The battery voltage forward biases a body diode 24 of transistor 23 so that the sources of transistors 21, 23, and 25 receive a voltage substantially equal to the value of the battery voltage. Since the gate of transistor 25 is at a voltage no greater than approximately zero volts, transistor 25 is enabled which couples the value of the battery voltage to the gates of transistors 21 and 23 thereby disabling transistors 21 and 23 and decoupling battery 11 from the charging voltage on input 15. Since both transistors 21 and 23 are disabled and because body diodes 22 and 24 connected back-to-back, battery 11 is protected from reverse or discharge current flow. As can be seen, since transistor 26 is disabled reverse current can not flow from battery 11 to unit 14 thereby protecting battery 11 from such reverse current.

Additionally, the negative voltage from the charging voltage is dropped substantially across thermistor 29. A large current begins flowing through thermistor 29 and circuit 31. The current flow increases the temperature and resistance of thermistor 29 which in turn reduces the current through thermistor 29. Thus, thermistor 29 limits the value of the charging current dissipated by system 10.

It should be noted that even if transistor 23 is formed so that its operation is symmetrical, that is, the source and drain are electrically interchangeable, transistor 21 still is off or disabled and disconnects battery 11 from the charging voltage on input 15. It should also be noted, that approximately during the time the negative voltage is applied to input 15, transistor 26 remains off, thus, there is no current flow through transistor 25 to unit 14 and thus to the charging voltage at input 15 thereby further limiting power dissipation of system 10.

In order to facilitate the operation described for FIG. 1, a first terminal of thermistor 29 is coupled to receive the charging voltage and a second terminal is commonly connected to a first terminal of clamp circuit 31, the gate of transistors 25 and 26, and to input 41 of unit 14. A second terminal of clamp circuit 31 is connected to a voltage common terminal. A source of transistor 26 is connected to output 42 of unit 14 and a drain of transistor 26 is commonly connected to a drain of transistor 25 and the gates of transistors 21 and 23. A drain of transistor 21 is coupled to receive the charging voltage. A drain of transistor 23 is coupled to receive the battery voltage from battery 11. The sources of transistors 21, 23, and 25 are commonly connected together at a node 28.

Figure 2:
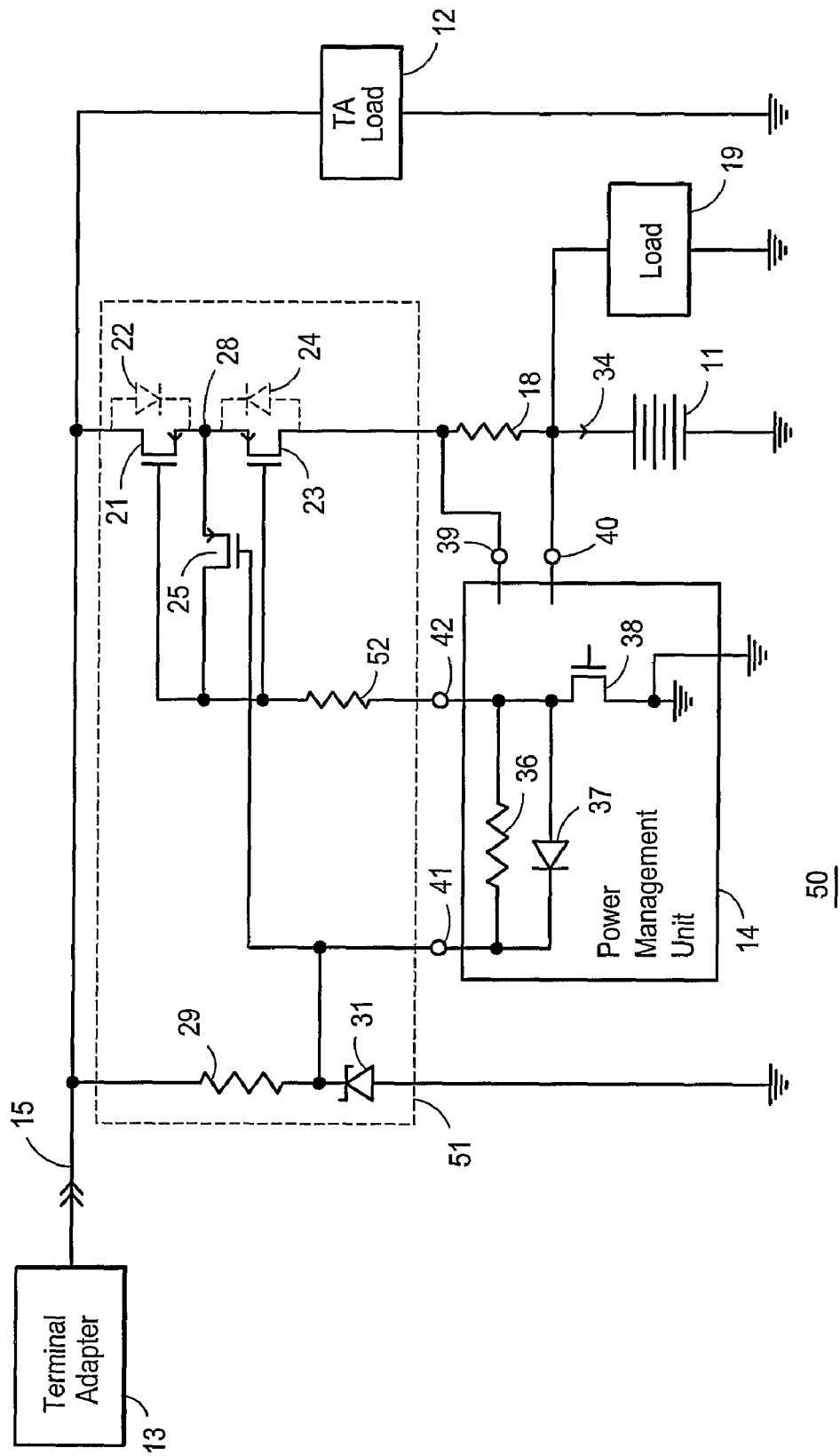
FIG. 2 schematically illustrates an embodiment of a portion of another battery protection system that is an alternate embodiment of the battery protection system of FIG. 1 in accordance with the present invention.

FIG. 2 schematically illustrates a portion of an embodiment of a battery protection system 50 that is an alternate embodiment of system 10 illustrated in FIG. 1. System 50 includes a battery protection circuit 51 that is an alternate embodiment of circuit 17 explained in the description of FIG. 1. Circuit 51 includes a current limiting resistor 52 that replaces transistor 26 of circuit 17. Resistor 52 is connected between output 42 of unit 14 and the gates of transistors 21 and 23 and the drain of transistor 25. Resistor 52 couples the voltage from output 42 to the gates of transistors 21 and 23 and to the drain of transistor 25 so that circuit 51 functions similarly to circuit 17. However, for the case where the charging voltage is approximately zero volts or less and transistor 25 is enabled, a discharge current may flow from battery 11 through transistors 23 and 25, through resistor 52, through resistor 36 of unit 14, and to the charging voltage through thermistor 29. The value of resistor 52 and thermistor 29 are chosen to minimize the value of this discharge current.

Figure 3:
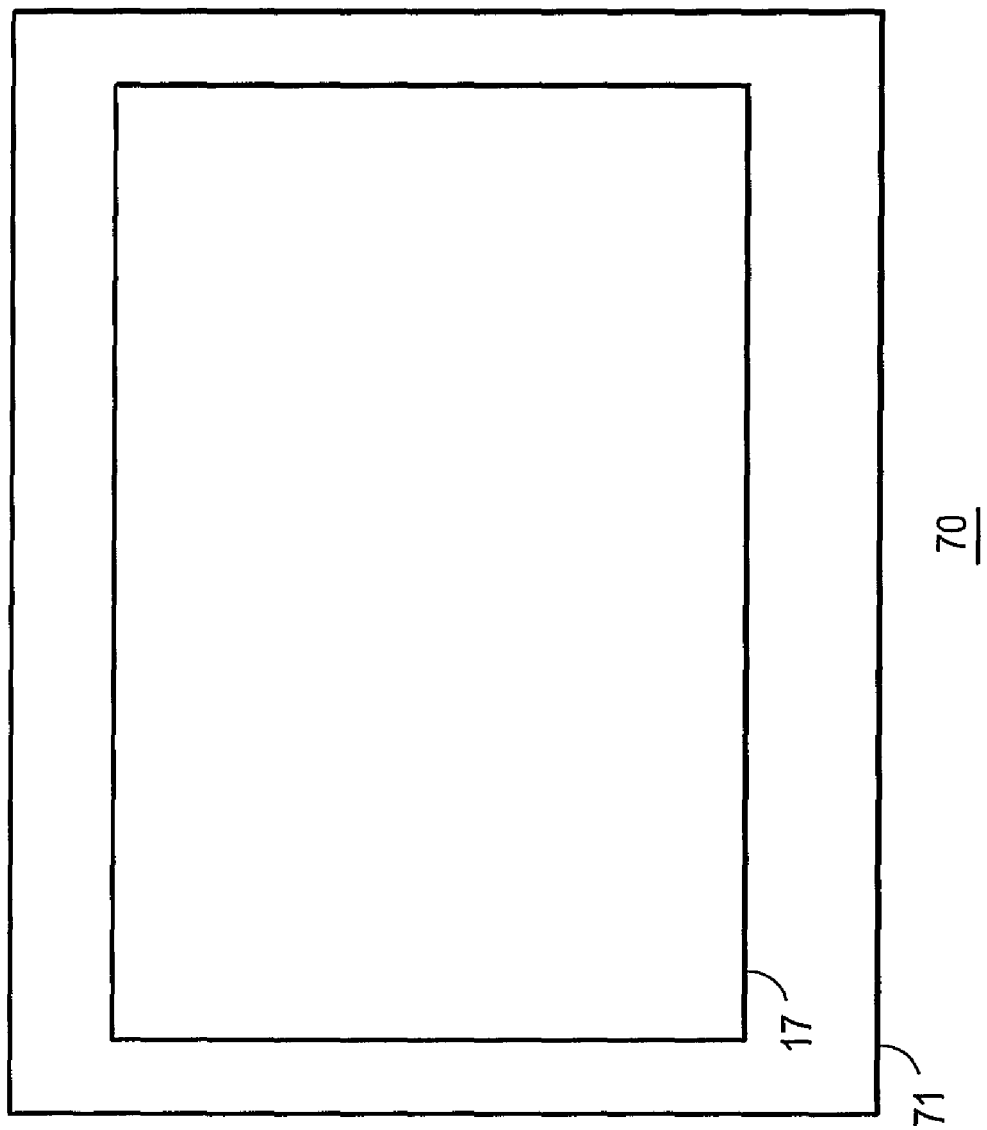
FIG. 3 schematically illustrates an enlarged plan view of a semiconductor device that includes a portion of the battery protection system of FIG. 1 in accordance with the present invention.

FIG. 3 schematically illustrates an enlarged plan view of a portion of an embodiment of a semiconductor device 70 that is formed on a semiconductor die 71. Circuit 17 is formed on die 71. Die 71 may also include other circuits that are not shown in FIG. 3 for simplicity of the drawing. Circuit 17 and device 70 are formed on die 71 by semiconductor manufacturing techniques that are well known to those skilled in the art.

In view of all of the above, it is evident that a novel device and method is disclosed. Included, among other features, is configuring a plurality of transistors to couple a battery to a charging voltage approximately when the charging voltage is greater than zero and less than a first voltage but decoupling the battery from the charging voltage approximately when the charging voltage is greater than the first voltage or approximately when the charging voltage is zero volts or less than zero volts. The operation of the circuit protects the battery and the charging controller or power management unit from over-voltage conditions, under-voltage conditions, and reverse current flow. Additionally, the operation of the circuit reduces the power dissipation of the system.

While the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a battery protection circuit comprising:
    configuring a plurality of transistors of a first conductivity type to receive a charging voltage from a voltage source and responsively couple a battery to the charging voltage at least a portion of a first time when the charging voltage is greater than approximately zero volts and is less than a first voltage;
    configuring the plurality of transistors to responsively decouple the battery from the charging voltage at least a portion of a second time when the charging voltage is less than approximately zero volts;
    configuring the plurality of transistors to decouple the battery from the charging voltage at least a portion of a third time when the charging voltage is no less than the first voltage; and
    coupling a first current carrying electrode of a first transistor of a second conductivity type to a control electrode of at least a first transistor of the plurality of transistors and to a second current carrying electrode of a second transistor of the plurality of transistors, coupling a control electrode of the first transistor of the second conductivity type to the control electrode of the second transistor of the plurality of transistors.

2. A method of forming a battery protection circuit comprising:
    configuring a plurality of transistors of a first conductivity type to receive a charging voltage from a voltage source and responsively to the charging voltage couple a battery to the charging voltage at least a portion of a first time when the charging voltage is greater than approximately zero volts and is less than a first voltage;
    configuring the plurality of transistors to decouple the battery from the charging voltage, responsively to the charging voltage, at least a portion of a second time when the charging voltage is less than approximately zero volts; and
    configuring the plurality of transistors to decouple the battery from the charging voltage, responsively to the charging voltage, at least a portion of a third time when the charging voltage is no less than the first voltage.

3. The method of claim 2 wherein configuring the plurality of transistors of the first conductivity type to receive the charging voltage from the voltage source and couple the battery to the charging voltage includes configuring the plurality of transistors having a first current carrying electrode commonly coupled together, having a second current carrying electrode and having a control electrode, wherein the second current carrying electrode of a first transistor of the plurality of transistors is configured to receive a voltage from the battery and the second current carrying electrode of a second transistor of the plurality of transistors is configured to receive the charging voltage.

4. The method of claim 3 further including coupling the second current carrying electrode of a third transistor of the plurality of transistors to the control electrode of the first transistor of the plurality of transistors.

5. The method of claim 4 further including coupling the second current carrying electrode of the third transistor of the plurality of transistors to the control electrode of the second transistor of the plurality of transistors.

6. A battery protection method comprising:
    providing a battery and a voltage source configured to provide a charging voltage;

coupling the battery to the charging voltage responsively to the charging voltage at least a portion of a first time when the charging voltage is greater than zero volts and is less than a first voltage;

decoupling the battery from the charging voltage responsively to the charging voltage at least a portion of a second time when the charging voltage is no greater than zero volts; and decoupling the battery from the charging voltage responsively to the charging voltage at least a portion of a third time when the charging voltage is no less than the first voltage.

7. The method of claim 1 further including coupling commonly together a first current carrying electrode of a first transistor, a second transistor, and a third transistor, coupling a second current carrying electrode of the first transistor to receive the charging voltage, coupling a second current carrying electrode of the second transistor to receive a battery voltage from the battery, and enabling the first transistor and the second transistor for coupling the battery to the charging voltage.

8. The method of claim 7 wherein decoupling the battery from the charging voltage includes disabling the first transistor and the second transistor at least a portion of a fourth time when the charging voltage is no less than the first voltage.

9. The method of claim 7 wherein decoupling the battery from the charging voltage includes disabling the first transistor and the second transistor approximately when the charging voltage is less than zero.

10. The method of claim 7 wherein decoupling the battery from the charging voltage includes disabling the second transistor and the third transistor at least a portion of a fourth time when the charging voltage is greater than the first voltage and less than a second voltage that is greater than the first voltage.

11. The method of claim 7 wherein coupling the battery to the charging voltage includes disabling the third transistor.

12. The method of claim 7 wherein coupling the battery to the charging voltage responsively to the charging voltage at least a portion of the first time when the charging voltage is greater than zero volts and is less than the first voltage includes enabling a fourth transistor to couple a voltage to a control electrode of the first and second transistors and enable the first and second transistors.

13. A battery protection circuit comprising:

a plurality of transistors of a first conductivity type having a control electrode, having a first current carrying electrode commonly connected together, and having a second current carrying electrode wherein the second current carrying electrode of at least one transistor of the plurality of transistors is configured to receive a voltage from a battery and a second current carrying electrode of another transistor of the plurality of transistors is configured to receive a charging voltage for the battery, wherein the control electrode of a first transistor of the plurality of transistors is coupled to the second current carrying electrode of a second transistor of the plurality of transistors, and wherein the control electrode of a third transistor of the plurality of transistors is coupled to the control electrode of the first transistor and the control electrode of the second transistor of the plurality of transistors is coupled to receive a voltage that is limited to a second voltage value that is greater than a maximum voltage of the battery; and a first transistor of a second conductivity type having a first current carrying electrode coupled to the control electrode of the third transistor of the plurality of transistors.

14. The battery protection circuit of claim 13 wherein the plurality of transistors of the first conductivity type are P-channel MOS transistors.

15. The battery protection circuit of claim 14 wherein the first transistor of the second conductivity type is an N-channel MOS transistor.

16. The battery protection circuit of claim 13 wherein a control electrode of the first transistor of the second conductivity type is coupled to the control electrode of the second transistor of the plurality of transistors.

* * * * *